May 15, 1923.
R. G. MERRITT
HYPSOMETER
Filed Feb. 11, 1915
1,455,347
2 Sheets-Sheet 1
Fig.1. Fig.2.
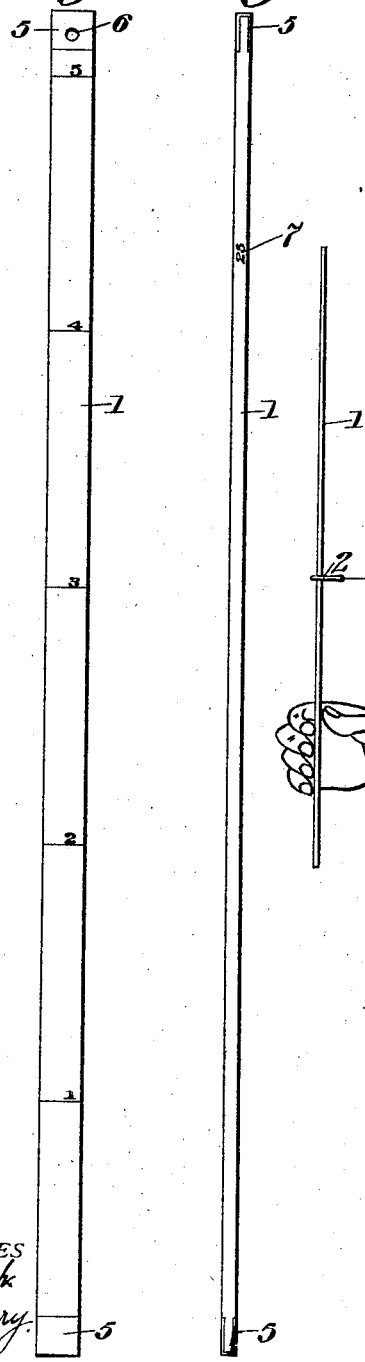
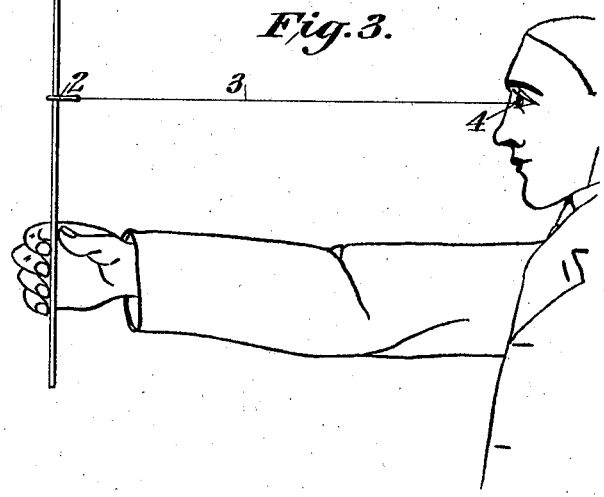
Fig.3.
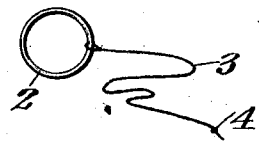
Fig.4.
WITNESSES
INVENTOR
Robert G. Merritt
Attorney

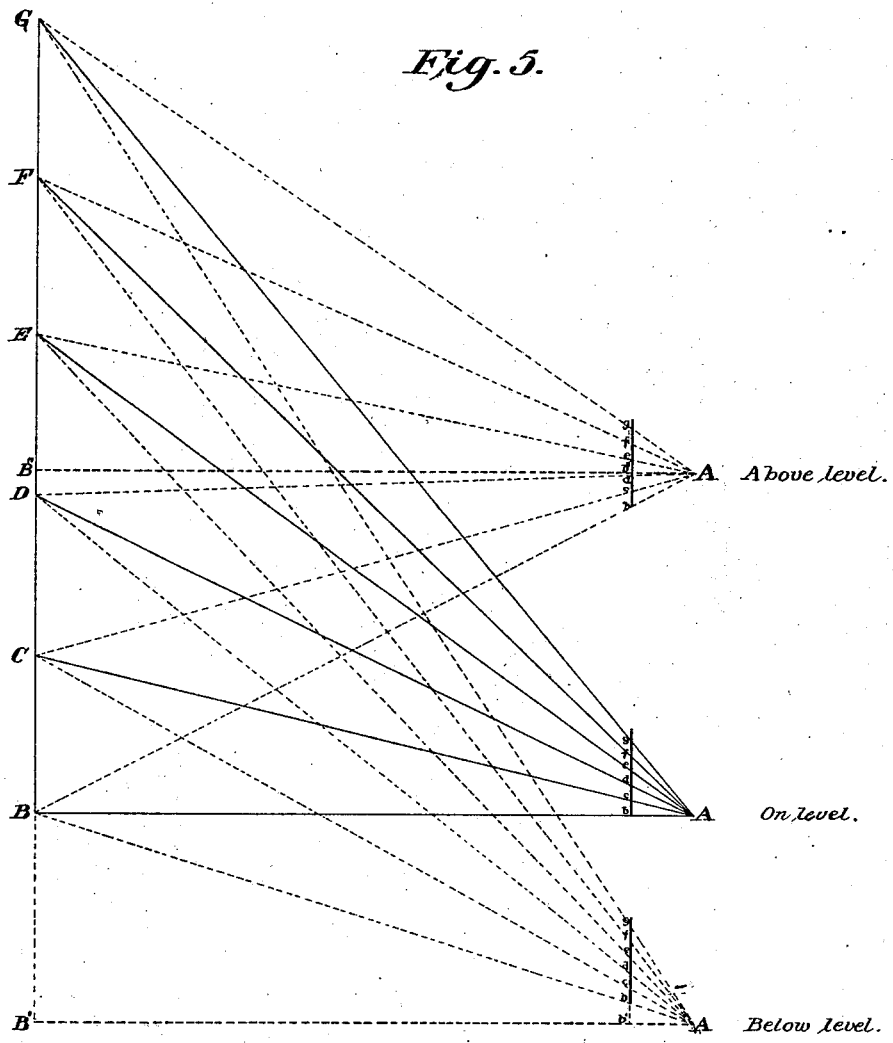

Patented May 15, 1923.

1,455,347

UNITED STATES PATENT OFFICE.

ROBERT G. MERRITT, OF NEW YORK, N. Y.

HYPSOMETER.

Application filed February 11, 1913. Serial No. 747,755.

(FILED UNDER THE ACT OF MARCH 3, 1883, 22 STAT. L., 625.)

*To all whom it may concern:*

Be it known that I, ROBERT G. MERRITT, a citizen of the United States, residing at New York, in the county of New York and State of New York, have invented a certain new and useful Improvement in Hypsometers, of which the following is a full, clear, and exact description.

This application is made under the act of March 3, 1883, chapter 143 (22 Stat., 625), and the invention herein described and claimed may be used by the Government of the United States or any of its officers or employees in the prosecution of work for the United States, or by any person in the United States, without the payment of any royalty thereon.

This invention relates to hypsometers, and more particularly to hypsometers for use in determining the number of log lengths in any standing tree.

All the commonly used instruments for making such calculations are of delicate construction, necessitating care in their handling and moreover they are expensive.

The instrument of the present invention is constructed in the form of a stick, similar in appearance to an ordinary yard stick, having upon one of its sides graduations spaced at the same predetermined distance apart, and this distance is equal to the product of the predetermined log length and the perpendicular distance at which the instrument is held from the eye of the observer, divided by the perpendicular distance at which the observer stands from the tree. The instrument is graduated to be used at a certain distance from the observer's eye when the observer is standing at a certain distance from the tree. As these two distances vary, the distance between graduations on the hypsometer must be varied.

If a stick has graduations for use at only one set of distances this is indicated on the edge of the stick.

It is obvious that the stick may be used for ascertaining the height of objects as well as the number of log lengths in trees.

In the accompanying drawings illustrating the invention, in the several figures of which like parts are similarly designated, Figure 1 is a side view of a hypsometer constructed in accordance with my invention and adapted for use at a single distance only from the tree or other object to be measured. Fig. 2 is an edge view. Fig. 3 is a view showing the manner in which the instrument is used. Fig. 4 shows a device for determining the correct distance at which to hold the instrument from the eye of the observer, the use of which is illustrated in Fig. 3. Fig. 5 is a diagrammatic view illustrating the geometrical principle on which the instrument is constructed.

1 is the stick, having graduations 1, 2, 3, 4 and 5, the distance between such graduations being determined as will be hereinafter described.

It has been ascertained, by experiment, that the average reach of a man is twenty-five inches, and that the most advantageous distance for the observer to stand from the object or tree to be measured is sixty-six feet, which two distances will be assumed to govern the following discussion. In using a stick graduated to conform with these two distances, or for others, it is desirable that the observer should know that he is holding the instrument at the proper distance from him, and for this purpose I provide the ring 2 of suitable diameter to easily slip along the stick, and to this ring I attach a non-elastic and non-shrinkable cord 3. At the far end of this cord, if the stick is for a man with a twenty-five inch reach, I make a knot 4, the knot being so situated that when the cord 3 is drawn taut, the distance from the face of the stick to the knot will be twenty-five inches. Therefore, if the observer wishes to use the stick he can readily ascertain the correct distance at which to hold it from his eye by inserting the stick through the ring, holding the knot near his eye, and drawing the string taut as shown in Fig. 3. The distance at which the instrument is to be held from the eye of the observer, is indicated in figures on one edge of the instrument as shown at 7.

The stick 1 is provided with a ferrule 5 at each end, and at one end the ferrule 5 and stick 1 are pierced by a hole 6 through which a thong or cord may be run for suspending the stick from the shoulder of the user when it is being carried.

This hypsometer is equally well adapted for use when the observer stands above, on a level with, or below the base of the butt log of a tree or the base of the object to be measured, as is illustrated in Fig. 5. If the tree or other object to be measured is inclined, the instrument should be given a like inclination so that the object and instrument will be parallel.

For purposes of describing the geometrical principle of the device, and referring to Fig. 5, let the graduations 1, 2, 3, 4, and 5 on the hypsometer be designated by $c$, $d$, $e$, $f$, and $g$ respectively, and the lower end of the stick be designated $b$, and the point of observation be designated A, and the log lengths on the tree be designated BC, CD, DE, EF and FG.

Using for demonstration the case in which the point of observation is on a level with the base of the butt log of the tree, or with the base of the object to be measured, the proof of the fact that the graduations on the stick are all the same distance apart, is as follows:—The distances AB, B$b$ and BC, CD, DE, EF and FG are known. The triangles ABC and A$bc$ are similar, because their angles are equal. Therefore, the altitude BC of the large triangle is to the altitude $bc$ of the small triangle as the hypotenuse AC of the large triangle is to the hypotenuse A$c$ of the small triangle. Also the triangles ACD and A$cd$ are similar, therefore CD is to $cd$ as AC is to A$c$; but things which equal the same thing are equal to each other, therefore, BC is to $bc$ as CD is to $cd$. But BC is equal to CD, hence $bc$ is equal to $cd$. $bc$ is also equal to $de$, $ef$ and $fg$, severally, as can be similarly proved.

The formula, hereinbefore stated, by which the stick is graduated, viz: the distance between graduations is equal to the product of the unit of length and the perpendicular distance from the point of observation to the stick, divided by the perpendicular distance from the point of observation to the object to be measured, applies for all positions of the observer above, on a level with, or below the level of the base of the object to be measured, and the proof thereof is as follows:—In the case where the point of observation is above the level of the base of the object to be measured:—

The triangles AB″E and A$b$″$e$ are similar $$\therefore AB'':Ab''::AE:Ae$$

and the triangles AEF and A$ef$ are similar $$\therefore EF:ef::AE:Ae$$
$$\therefore AB'':Ab''::EF:ef$$
$$\therefore ef = \frac{EF \times Ab''}{AB''}$$

But EF=BC and $ef=bc$ $$\therefore bc = \frac{BC \times Ab''}{AB''}$$

In the case where the point of observation is on a level with the base of the object to be measured:—

The triangles ABC and A$bc$ are similar $$\therefore BC:bc::AB:Ab$$
$$\therefore bc = \frac{BC \times Ab}{AB}$$

In the case where the point of observation is below the level of the base of the object to be measured:—

The triangles ABC and A$bc$ are similar $$\therefore BC:bc::AB:Ab$$

and the triangles AB′B and A$b$′$b$ are similar $$\therefore AB':Ab'::AB:Ab$$
$$\therefore AB':Ab'::BC:bc$$
$$\therefore bc = \frac{BC \times Ab'}{AB'}$$

This hypsometer is convenient and light to handle; cannot become inaccurate because of changing atmospheric conditions or rough handling, and is of very cheap and durable construction.

For careful measurement of individual trees, on sample plots, or wherever great precision is more important than speed or convenience, this hypsometer is not an entirely satisfactory substitute for the well-known Faustmann height measure, or some of the other delicate and expensive instruments; but for ordinary timber estimating it far surpasses these instruments, because of its lightness, simplicity, ease of manipulation, indestructibility and the ease with which calculations may be made with it.

This instrument may be provided on one side with the data of the well-known Biltmore stick, and it then constitutes a combined caliper and hypsometer, thus doing away with the necessity for carrying both calipers and hypsometers in the field. If desirable, the well-known Scribner decimal C rule data may be placed upon an edge of the instrument, thus making a convenient, practical and efficient instrument for all-around woods use.

This hypsometer may be graduated either for use at a single specified distance from the tree, or for use at several different distances from the tree, in which latter case the different sets of graduations would have a designation of the distance from the tree at which they become effective.

It is to be understood that I do not limit my invention to the particular type of stick shown in the drawings, as it is obvious that it may be of any convenient shape or form, so long as it has sufficient length on which to mark the graduations.

What I claim is:—

A hypsometer, comprising a stick adapted for use in a vertical position and having marked upon it graduations, the distance between any two of which is the same, and a device for determining the proper distance at which the instrument is to be held from the observer when in use, comprising a ring to be slipped over the stick and a cord attached at one end to said ring and having a knot at a predetermined distance from its other end.

In testimony whereof I have hereunto set my hand this 10th day of February, A. D. 1913.

ROBERT G. MERRITT.

Witnesses:
H. G. SPAHR,
A. P. HAMILTON.